United States Patent
Meitzner et al.

(10) Patent No.: US 7,433,210 B2
(45) Date of Patent: Oct. 7, 2008

(54) SWITCHED-MODE POWER SUPPLY COMPRISING AN ADJUSTABLE OSCILLATOR

(75) Inventors: Michael Meitzner, Villingen-Schwenningen (DE); Wolfgang Hermann, Tennenbronn (DE); Jean-Paul Louvel, Brigachtal (DE)

(73) Assignee: Thomson Licensing, Boulogne-Billancourt (FR)

( * ) Notice: Subject to any disclaimer, the term of this patent is extended or adjusted under 35 U.S.C. 154(b) by 5 days.

(21) Appl. No.: 10/574,672

(22) PCT Filed: Sep. 18, 2004

(86) PCT No.: PCT/EP2004/010502

§ 371 (c)(1),
(2), (4) Date: Mar. 31, 2006

(87) PCT Pub. No.: WO2005/043735

PCT Pub. Date: May 12, 2005

(65) Prior Publication Data

US 2007/0058399 A1      Mar. 15, 2007

(30) Foreign Application Priority Data

Oct. 10, 2003 (DE) ............................... 103 47 193

(51) Int. Cl.
*H02M 3/335*      (2006.01)
*H02M 5/42*      (2006.01)

(52) U.S. Cl. ............... 363/21.12; 363/21.16; 363/21.18

(58) Field of Classification Search .......... 363/21.12, 363/21.16, 21.17, 21.18, 20, 95, 97, 131
See application file for complete search history.

(56) References Cited

U.S. PATENT DOCUMENTS

| | | | | |
|---|---|---|---|---|
| 4,253,137 A | * | 2/1981 | Rao | 363/21.1 |
| 4,361,865 A | * | 11/1982 | Shono | 363/19 |
| 4,504,898 A | * | 3/1985 | Pilukaitis et al. | 363/49 |
| 4,648,016 A | * | 3/1987 | Peruth et al. | 363/21.08 |
| 5,412,556 A | * | 5/1995 | Marinus | 363/21.05 |
| 5,420,777 A | * | 5/1995 | Muto | 363/21.17 |
| 6,515,876 B2 | | 2/2003 | Koike et al. | |
| 2005/0099827 A1 | * | 5/2005 | Sase et al. | 363/16 |

OTHER PUBLICATIONS

Y. Panov et al: "Adaptive off-time control for variable-frequency, soft-switched flyback converter at light loads" Power Electronics Specialists Conference, 1999, PESC 99, 30th Annual IEEE Charleston, SC, USA Jun. 27-Jul. 1, 1999, pp. 457-462.

Bill Andreycak: "Application Note—The UCC38C42 Family of High-Speed, BICMOS Current Mode PWM Controllers", Texas Instruments—Application Notes, Feb. 2002, pp. 1-18.

Shixiang Zhou et al: "Design of 80 W two-stage adapter with high efficiency and low no load input power" APEC 2002, 17th Annual IEEE Applied Power Electronics Conference and Exposition, Dallas, TX Mar. 10-14, 2002, vol. 2 of 2, Conf. 17, Mar. 10, 2002, pp. 728-732.

German Search Report dated Jul. 6, 2004.

* cited by examiner

*Primary Examiner*—Bao Q Vu
(74) *Attorney, Agent, or Firm*—Joseph J. Laks; Robert D. Shedd

(57) ABSTRACT

The switched-mode power supply has a transformer which contains a primary winding and at least one secondary winding, a switching transistor in series with the primary winding, a driver stage for controlling the switching transistor, and a control circuit for controlling an output voltage. The control circuit in this case contains an oscillator which can be adjusted via a connection and is coupled to a secondary winding in order to determine the time at which the switching transistor is switched on. A switching stage is, in particular, arranged between the connection and the secondary winding and passes on a supply voltage to the connection when a sudden voltage change occurs on the secondary winding at the time of an oscillation. In consequence, the switching transistor is switched on at a time at which the losses when switched on are low, thus considerably reducing the losses which occur in the switching transistor.

11 Claims, 3 Drawing Sheets

SWITCHED-MODE POWER SUPPLY COMPRISING AN ADJUSTABLE OSCILLATOR

This application claims the benefit, under 35 U.S.C. §365 of International Application PCT/EP04/010502, filed Sep. 18, 2004, which was published in accordance with PCT Article 21 (2) on May 12, 2005 in English and which claims the benefit of German patent application No. 10347193.6, filed Oct. 10, 2003.

The invention relates to a Switched-mode power supply having a transformer, which has a primary winding and at least one secondary winding, having a switching transistor in series with the primary winding, and having a control circuit for controlling an output voltage of the switched-mode power supply. The control circuit in this case has an oscillator, which presets a frequency at which the switching transistor is switched on and off. Switched-mode power supplies of this type are used, for example, in televisions, video recorders and set-top boxes.

Appliances of this type normally use switched-mode power supplies based on the flyback converter principle, which produce a large number of stabilized supply voltages on the output side. During operation, the control circuit regulates one of the output voltages via a control loop. This also results in the other output voltages from the switched-mode power supply being stabilized. The control circuit in this case controls the switching transistor by means of a control signal such that the output voltage, which is linked to the control loop, is kept constant by means, for example, of pulse width modulation (PWM) or by varying the frequency of the control signal for the switching transistor.

Integrated circuits (ICs) are frequently used as the control circuits, thus considerably simplifying the design of a switched-mode power supply. Circuits of this type normally contain control circuits, an oscillator, a driver stage for directly driving a switching transistor, circuits for the production of internal operating voltages, as well as protection circuits.

Figure 1:
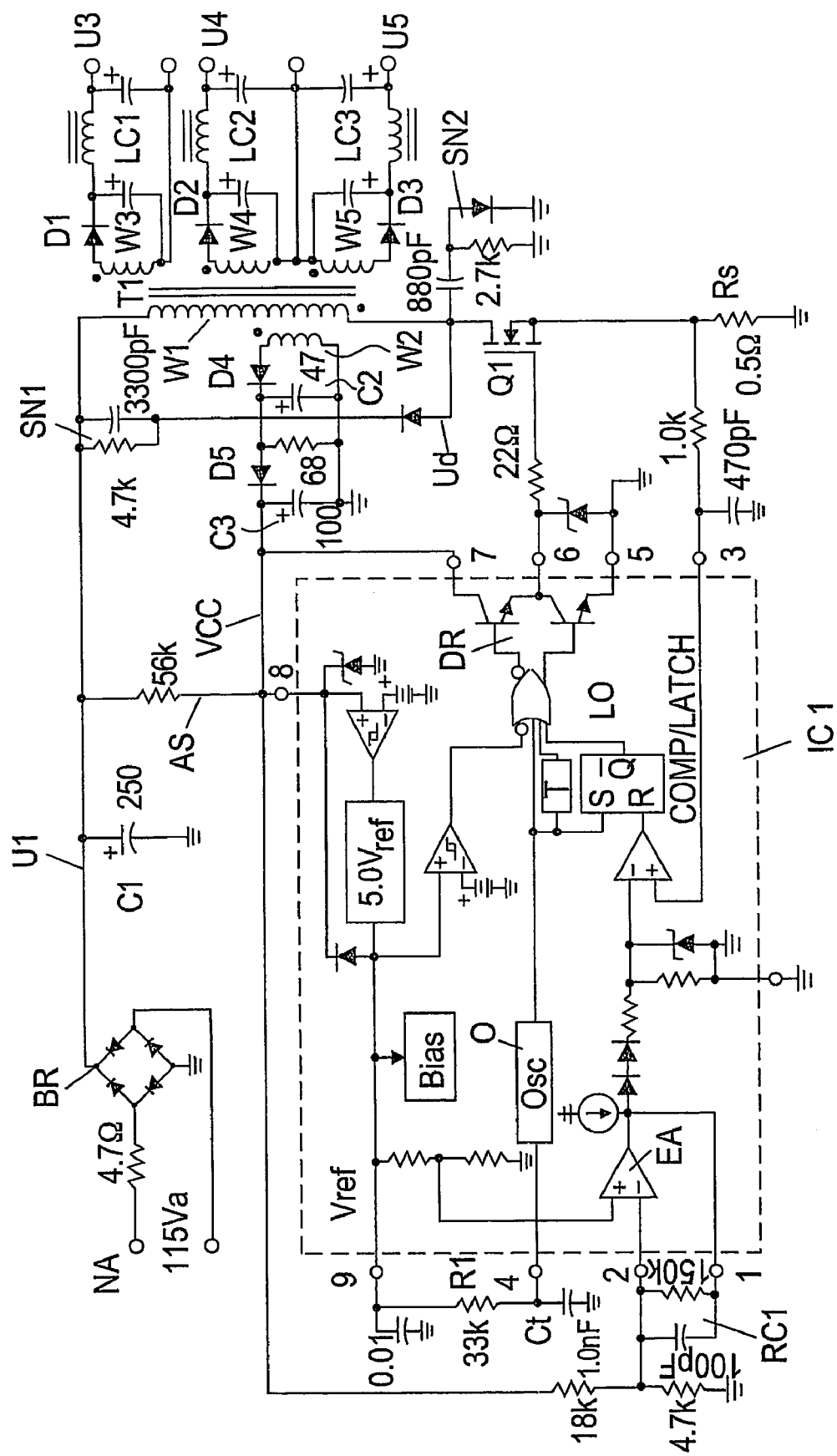

A switched-mode power supply according to the prior art, which has an integrated circuit IC1, is illustrated in FIG. 1. The switched-mode power supply uses a bridge rectifier BR on the input side, by means of which an AC voltage which is applied to a mains connection NA is rectified. The rectified voltage U1 is smoothed by means of an energy storage capacitor C1, and is applied to a primary winding W1 of a transformer T1. The transformer T1 provides mains isolation between the primary and secondary, and on the primary side, has an auxiliary winding W2 for production of an operating voltage VCC for the integrated circuit IC1 and, on the secondary side, has windings W3-W5 for production of stabilized output voltages U3-U5. Rectified voltages are tapped off using rectifier means D1-D3 across the windings W3-W5, and are then smoothed by means of low-pass filters LC1-LC3.

A switching transistor Q1, in this exemplary embodiment a MOSFET, whose output side is connected to earth via a measurement resistor Rs, is connected in series with the primary winding W1. The control input of the switching transistor Q1 is connected to a driver stage DR of the integrated circuit IC1, by means of which the switching transistor Q1 is controlled. The switched-mode power supply is in the form of a flyback converter, that is to say energy is stored in the transformer T1 during operation when the switching transistor Q1 is switched on, and is transmitted to the windings W2-W5 in the subsequent phase in which the switching transistor Q1 is switched off.

This embodiment of the switched-mode power supply has a control system on the primary side which operates via the supply voltage VCC. The supply voltage VCC is produced during operation by means of the auxiliary winding W2, diodes D4, D5 and capacitors C2, C3. The supply voltage VCC is applied to a connection 7 of the integrated circuit IC1, so that the driver stage DR is supplied with voltage for operation of the switching transistor Q1, and is applied to a connection 8, via which the integrated circuit IC1 produces internal reference voltages as well as stabilized supply voltages for operation of its circuits. The supply voltage VCC is also applied via an RC filter RC1 and a connection 2 to an error amplifier EA in the integrated circuit IC1, providing regulation at a constant supply voltage VCC. This also stabilizes the output voltages U3-V5, since the windings W2-W5 are coupled to one another.

The integrated circuit IC1 can also be used for switched-mode power supplies which are controlled on the secondary side. A switched-mode power supply which is based on the flyback converter principle and whose output voltage is regulated on the secondary side is described, for example, in U.S. Pat. No. 4,876,636, which is hereby referred to. Regulation on the secondary side results in better voltage stabilization. The control loop in this case requires a transformer, for example an optocoupler, a transmitter, for example an optocoupler, via which the control signal is transmitted from the secondary side to the primary side.

The integrated circuit IC1 has an oscillator O, whose frequency can be adjusted by external circuitry by means of a resistor R1 and a capacitor Ct at the connection 4. The capacitor Ct is in this case charged via the resistor R1 by means of a reference voltage Vref, which is applied to the connection and is produced in the integrated circuit IC1. When the voltage across the capacitor Ct reaches a specific threshold value, this capacitor Ct is discharged via the connection 4 of the integrated circuit IC1, so that a new charging cycle can then take place.

The oscillator O presets the switching frequency for the driver stage DR, and the pulse width of the driver signal that is produced in the driver stage DR is varied via the error amplifier EA and a downstream logic circuit LO, so that the output voltages of the switched-mode power supply are stabilized.

The switching frequency of the driver stage DR is in this case half the switching frequency of the oscillator O. A sawtooth pulse in this case presets the maximum time for which the switching transistor Q1 is switched on, and the subsequent sawtooth pulse sets the dead time, in which the switching transistor is switched off. This results in a maximum preset pulse width ratio of 50%, so that the transformer T1 is always demagnetized in the switched-off phase before the switching transistor Q1 is switched on again.

The switched-mode power supply also has a starting circuit AS, via which the integrated circuit IC1 is supplied with power once the switched-mode power supply has been switched on. In order to damp voltage spikes, a first damping network SN1 is connected on the input side to the switching transistor Q1 and is used to dissipate voltage spikes to the energy storage capacitor C1, and a second damping network SN2, which is connected in parallel with the switching transistor Q1.

The integrated circuit IC1 which has been described with reference to FIG. 1 is in this exemplary embodiment a frequently used UC3845 Type, which is available, by way of example, from the company On Semiconductor (http://onsemi.com). Other controller ICs, such as MC33260, FA13843 and KA3843, also use external circuitry with a capacitor, by means of which the switching frequency of the switched-mode power supply can be adjusted.

The object of the present invention is to specify a switched-mode power supply of the type mentioned initially which has low losses.

This object is achieved for a switched-mode power supply by the features specified in claim 1. Advantageous developments of the invention are specified in the dependent claims.

The switched-mode power supply according to the invention has a transformer with a primary winding and two or more secondary windings, a switching transistor in series with a primary winding, a driver stage for controlling the switching transistor and a control circuit for regulating an output voltage. The control circuit in this case contains an oscillator, which can be adjusted via a connection and is coupled to a secondary winding in order to determine the time at which the switching transistor is switched on when an oscillation, in particular an oscillation minimum, occurs on the secondary winding.

In one preferred exemplary embodiment, this is achieved by means of a switching stage which passes on a supply voltage to the connection when a sudden voltage change occurs on the secondary winding at the time of an oscillation. This results in the voltage at the connection going high, so that the switching transistor is switched on via the oscillator, and a new sawtooth pulse is triggered. Since a voltage minimum likewise occurs at the current input of the switching transistor when a voltage minimum occurs on the secondary winding, the switching transistor is switched on at a time at which the switched-on losses are low. This makes it possible to considerably reduce the heat losses that are produced in the switching transistor.

The switching stage is advantageously coupled to the driver stage in order to block the switching stage when the switching transistor is switched on by a positive voltage from the driver stage. This prevents the sawtooth pulse which defines the switching on of the switching transistor from being disturbed by the switching stage but since this sawtooth pulse determines the output power of the switched-mode power supply via the pulse width ratio.

In one preferred exemplary embodiment, the connection is an oscillator connection of an oscillator that is arranged in an integrated circuit, and the supply voltage is a reference voltage which is emitted at a second connection of the integrated circuit and is applied to the oscillator connection via an RC circuit. However, the invention is not restricted to switched-mode power supplies with an integrated circuit on the primary side as a controller circuit, and can also be used for switched-mode power supplies which have a discrete circuit on the primary side, with an oscillator, a driver stage and a control circuit.

Figure 2:
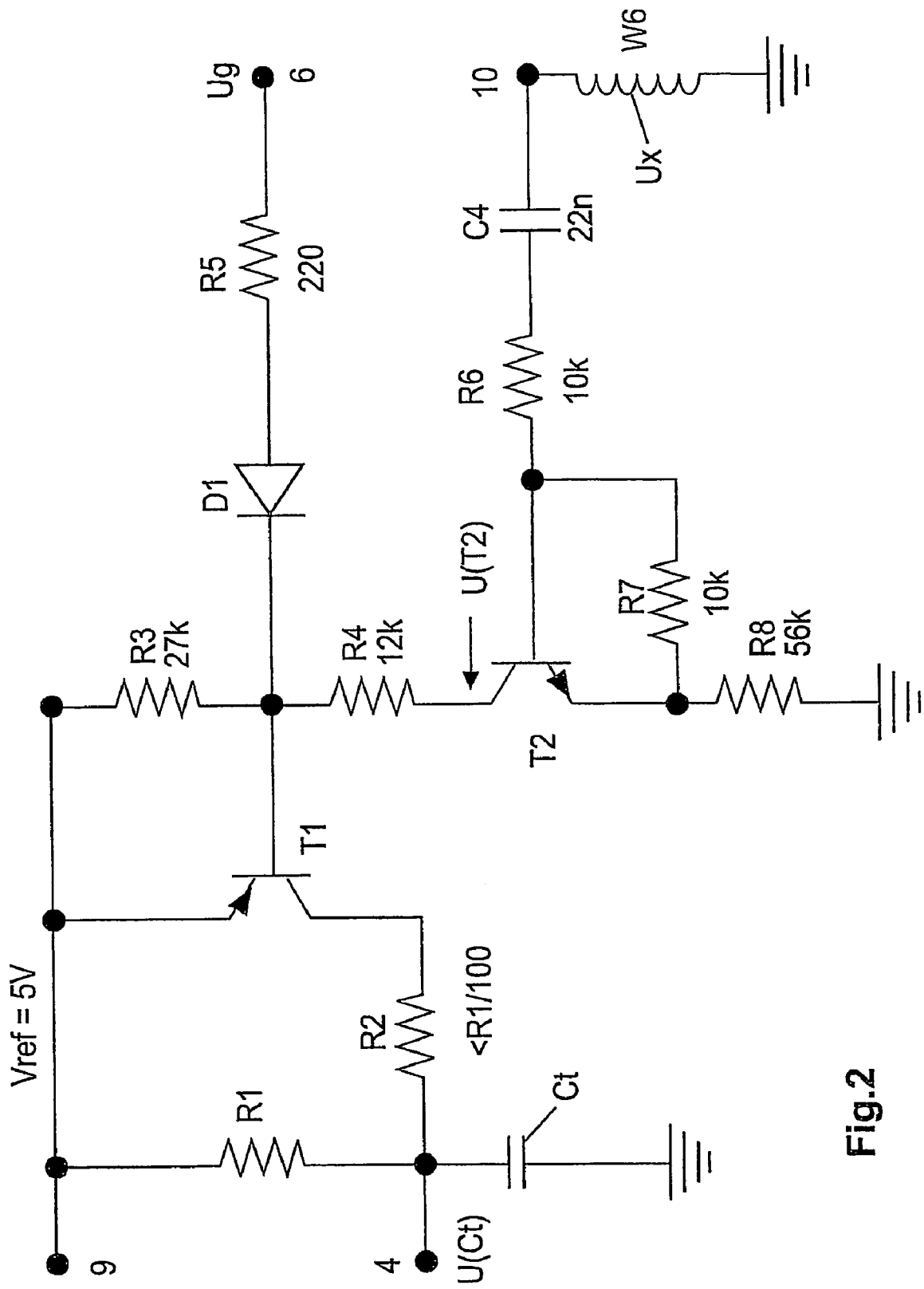
Figure 3:
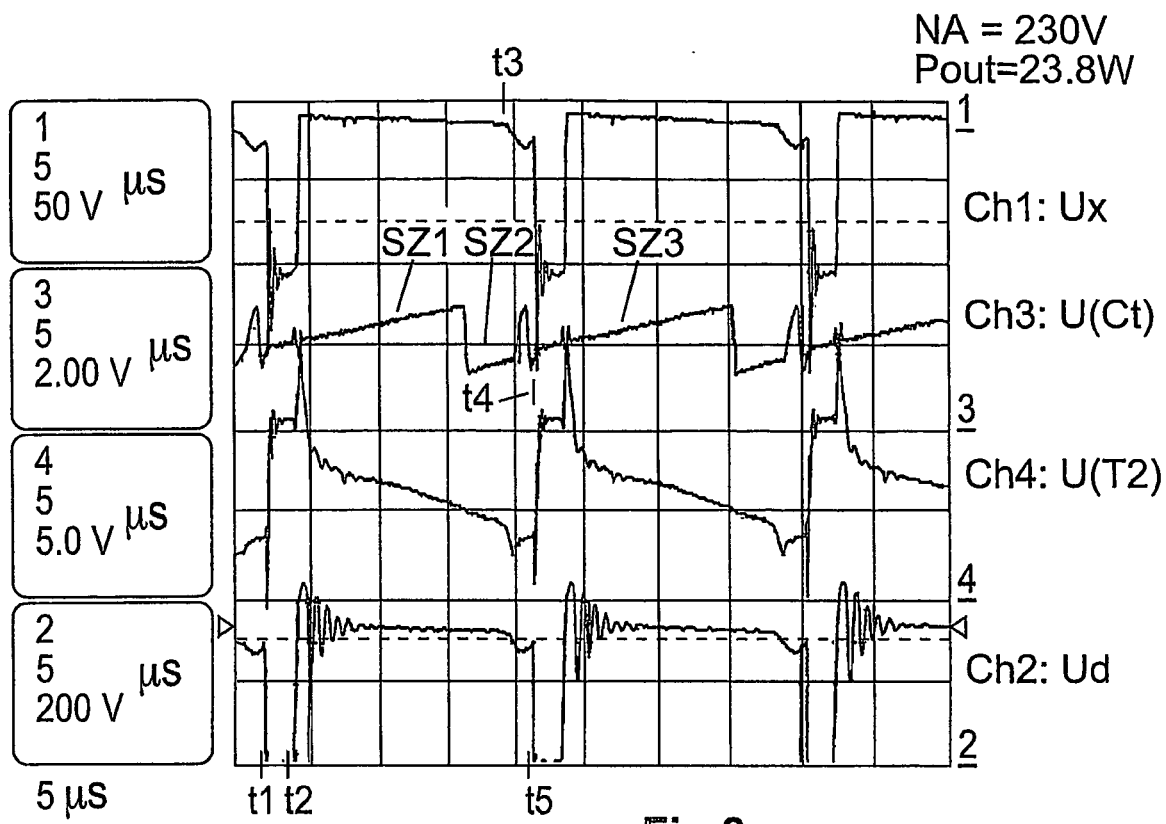
Figure 4:
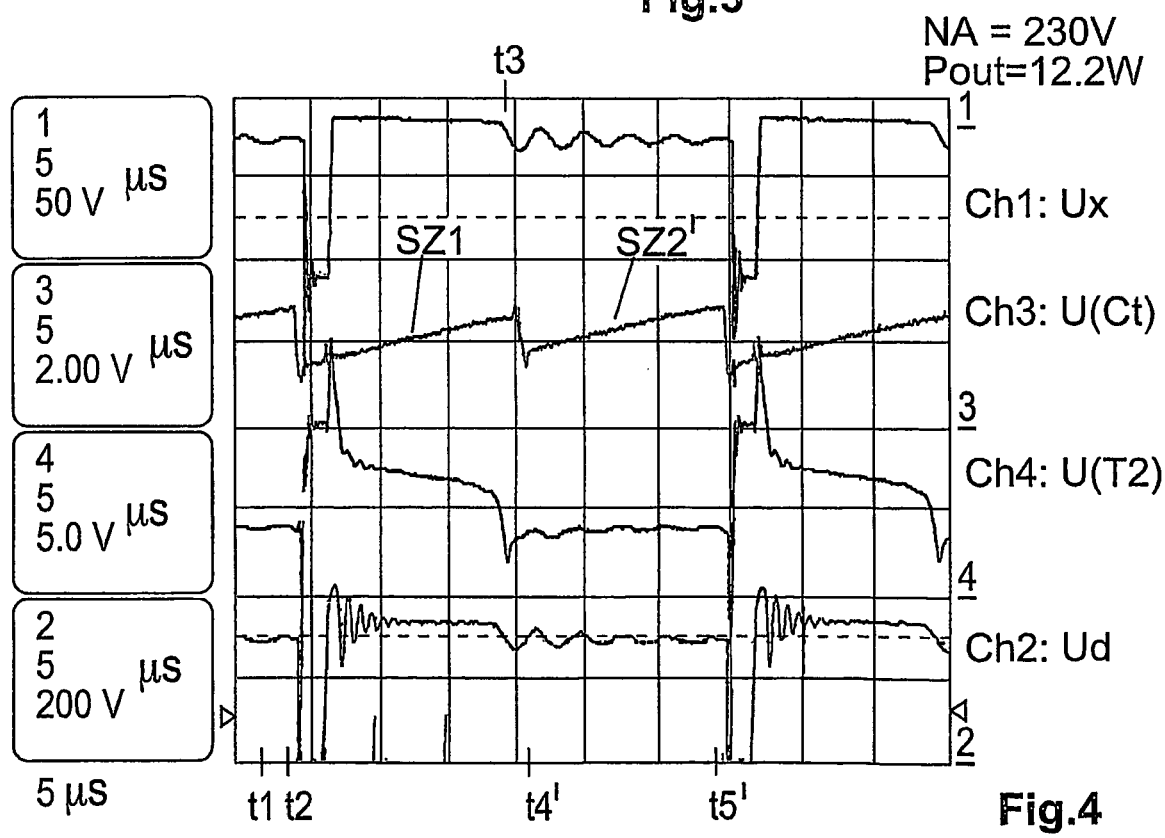

The invention will be explained in more detail in the following text with reference, by way of example, to schematic drawings, in which:

FIG. 1 shows a switched-mode power supply with an integrated circuit on the primary side according to the prior art, FIG. 2 shows a switching stage for controlling the time at which the switching transistor is switched on, FIG. 3 shows voltage diagrams of the switched-mode power supply during operation at a relatively high power level, and FIG. 4 shows voltage diagrams of the switched-mode power supply during operation at a relatively low power level.

In FIG. 2, a switching stage which has two transistors T1, T2 is arranged between a connection 4 of an integrated circuit and a secondary winding W6 of a transformer in the switched-mode power supply. The integrated circuit corresponds in particular to the circuit described in FIG. 1. The secondary winding W6 may be any desired auxiliary winding on the primary side of the transformer which is illustrated in FIG. 1. The components of the switched-mode power supply according to the invention, which are not illustrated in FIG. 2, likewise correspond, for example, to the switched-mode power supply in FIG. 1. The same reference symbols are therefore used for identical components. The switched-mode power supply may have control on both the primary side and on the secondary side, and preferably operates on the flyback converter principle. The time at which the switching transistor Q1, which is connected to the primary winding of the transformer, is switched on is preset via the secondary winding W6 and the switching stage, FIG. 1.

The connection 4 is connected via a resistor R1 to a supply voltage Vref which is applied to a connection 9, for example to the connection 9 of the integrated circuit IC1 shown in FIG. 1. The connection 4 is connected to earth via a capacitor Ct. In consequence, the capacitor Ct is periodically charged, as described above, by the supply voltage which is applied to the connection 9. A first transistor T1 and a resistor R2 with a low impedance are connected in parallel with the resistor R1, so that the resistor R1 is bridged when the transistor T1 is switched on. The control input of the transistor T1 is connected to the secondary winding W6 via a second transistor T2. The transistor T1 is, in particular, a pnp transistor, and the transistor T2 is an npn transistor, so that a positive voltage switches on the transistor T2 and, in consequence, the transistor T1.

A resistor R3 and a resistor R4 are connected in series with the current input of the transistor T2 in order to set voltages and in order to limit currents in the two transistors. The resistor R3 is in this case connected to the connection 9. A voltage divider formed by the resistors R6, R7 and R8 is arranged between the transistor T2 in the switching stage and the secondary winding W6, and is used to defined a threshold value for switching on the transistor T2. Furthermore, a capacitor C4 is connected between the transistor T2 and the secondary winding W6, and is used to limit the time of the voltage pulses in the secondary winding W6.

The control input of the transistor T1 is connected via the resistor R3 to the supply voltage Vref which is applied to the connection 9, in this example 5 volts, and is coupled via a diode D1 and a resistor R5 to an output 6 of the driver stage, which controls the switching transistor Q1 which is connected to the primary winding of the transformer. In this exemplary embodiment, this is the output 6 of the integrated circuit IC1 illustrated in FIG. 1. This ensures that the transistor T1 is switched off for as long as the switching transistor in the switched-mode power supply is switched on. The transistor T2 can thus not switch the transistor T1 on in this time interval. However, if the driver voltage Ug applied to the connection 6 is zero or is close to zero in order to switch off the switching transistor Q1, the transistor T1 can be switched on by the transistor T2.

The circuit operates as follows: when the switching transistor Q1 is switched on, then the voltage Ug at the connection 6 is high, for example approximately 20 volts. This keeps the transistor T1 switched off via the diode D1. When the switching transistor Q1 is subsequently switched off, the voltage Ug at the connection 6 falls to about 0 volts. The diode D1 then becomes reverse-biased, so that the transistor T1 is not influenced by the voltage Ug in this time phase.

The voltage Ux on the secondary winding W6 is reversed when the switching transistor Q1 is switched off, corresponding to the voltage Ud at the current input of the switching transistor Q1, and remains approximately constant for as long as the energy which is stored in the transformer is being transmitted to the secondary windings. Once the magnetization of the transformer has been dissipated, voltage oscillations occur on the windings of the transformer as a result of capacitances which are connected to the transformer, in particular as a result of the capacitance in the snubber network SN2, see FIG. 1.

The transistors T2 and T1 are thus switched on by a sudden positive voltage change at the connection 10 of the winding W6 at the time of the first oscillation, so that the capacitor Ct is charged in a short time by the supply voltage Vref up to the threshold value at which the capacitor Ct is discharged again, and the integrated circuit IC1 once again switches on the switching transistor Q1 via the driver stage, and the next charging process of the capacitor Ct takes place. Since the capacitor C4 applies only a short voltage surge to the base of the transistor T2, the transistor T1 has already been switched off when the capacitor Ct is being charged once again.

If the switched-mode power supply is operating with a relatively high load, then the voltages Ux, Ud the voltage across the capacitor Ct, U(Ct) and the voltage at the collector of the transistor T2, U(T2) appear as is illustrated in FIG. 3. In this case, the switched-mode power supply operates with a mains voltage NA of 230 volts, and produces an output power of 23.8 watts. If the switching transistor Q1 is switched on at a time t1, then the voltage Ud is approximately zero and the voltage Ux across the winding W6, which corresponds to a mirror image of the voltage Ud across the primary winding W1, is negative. The gate voltage Ug is high, for example 20 volts, in the time interval t1-t2 in which the switching transistor Q1 is switched on, so that the voltage at the collector of the transistor T2, U(T2) is likewise high, since the diode D1 is forward-biased.

The switching transistor Q1 is switched off at the time t2, so that both Ux and Ud rise steeply. As long as energy is being transmitted to the secondary windings in the switched-off phase, both the voltage Ud and the voltage Ux remain high.

When the switching transistor Q1 is switched on, at the time t1, a first sawtooth pulse SZ1, with a voltage U(Ct), starts at the same time at the connection 4, since the capacitor Ct is being charged. With the higher power of the switched-mode power supply of 23.8 W, this ends before a time t3, prior to which the transformer T1 transmits energy to the secondary windings. The voltage U(T2) at the collector of T2 falls gradually in the time period from t2 to t3, since the diode D1 is reverse-biased.

As mentioned above, the transformer discharge phase is followed by an oscillation phase, until the time t3, in which the voltages Ux and Ud fall. Owing to the inverted polarity of the secondary winding W6, the voltage drop produces a positive voltage pulse at the connection 10 of the winding W6, so that the transistor T2 is then switched on via the capacitor C4. The voltage U(T2) thus falls steeply. In consequence, the capacitor Ct is charged very quickly via the transistor T1 until the threshold value is reached at a time t4, at which the capacitor Ct is discharged again. This results in the switching transistor Q1 being switched on again at a time t5. Thus, if the power is relatively high, the time at which the switching transistor Q1 is switched on occurs in the interval of the sawtooth pulse SZ2, so that a new sawtooth pulse SZ3 starts, which corresponds to the pulse SZ1. The time t5 likewise corresponds to the time t1.

However, if the power is less, the first oscillation after the discharge phase of the transformer T1 occurs, in the time interval of the first sawtooth pulse SZ1, as is illustrated in FIG. 4. The output power of the switched-mode power supply is in this case 12.2 watts. The phase in which the switching transistor Q1 is switched on, the time interval t1-t2 is somewhat shorter here, so that less energy is stored in the transformer T1. The demagnetization phase of the transformer T1, the time interval t2-t3, is in consequence likewise shorter, and the time t3 therefore still occurs within the first sawtooth pulse SZ1.

The voltage drop across the winding W6 after the time t3 once again results in a positive voltage pulse at the connection 10, so that the transistor T2 is switched on, as can be seen from the measurement curve CH4, U(T2) in FIG. 4. This therefore ends the first sawtooth pulse SZ1 by the capacitor Ct being charged up to the threshold value voltage via the transistor T1, so that a second sawtooth pulse SZ2' starts at a time T4'. However, since the integrated circuit switches the switching transistor Q1 on again after the second voltage pulse SZ2' or SZ2, as has been explained above, then, when the power of a switched-mode power supply is relatively low, this results in a long quiescent phase of the transformer, the interval t4'-t5', during which the capacitor Ct is charged only via the resistor R1.

In consequence, when the output power is low, the switched-mode power supply runs at only about half the switching frequency of that used for a higher output power. Beyond a certain output power level, the start of the oscillation phase in this case occurs in the time interval of the first sawtooth pulse SZ1, that is to say the switching frequency is approximately halved below this threshold value. Thus, when the power is low, the switching transistor Q1 is not switched on by the switching stage in FIG. 2, but by the charging cycle t4'-t5' of the second sawtooth pulse SZ2'.

The circuit illustrated in FIG. 2 results in the integrated circuit IC1, which is in fact in the form of an SMPS current mode controller for a fixed switching frequency, operating at a variable switching frequency corresponding to the output power. However, the switching transistor cannot be switched on at a voltage minimum of an oscillation which follows a discharge phase of a transformer if the switching frequency is fixed. This is made possible by the circuit illustrated in FIG. 2. The integrated circuit IC1 thus operates as a current mode PWM controller with a low switching frequency when the switched-mode power supply output power levels are low, and operates as a quasi-resonant flyback converter, in which the losses when the switching transistor Q1 is switched on are reduced, when the output power levels are higher. A low switching frequency with a low power is particularly advantageous for low-loss standby operation.

The UC3845 integrated circuit is preferably used as the integrated circuit IC1 for the switched-mode power supply described here, although other SMPS controller ICs which, in particular, have a connection for a capacitor Ct by means of whose charging phase the switching frequency of the integrated circuit is controlled may, however, likewise be used. The invention can also be used for switched-mode power supplies which have a control circuit with a discrete component, with an oscillator for the switching transistor which use a control circuit with discrete components and with an oscillator for the switching transistor Q1, instead of an integrator SMPS controller circuit. The invention can be used not only for switched-mode power supplies which are controlled on the secondary side, but also for switched-mode power supplies which are controlled on the primary side. In particular, the auxiliary winding W6 may also be combined with the winding W2 in FIG. 1, or may correspond to it. Further modifications of the invention will be evident to a person skilled in the art.

The invetion claimed is:
1. Switched-mode power supply comprising:
a transformer with a primary winding and at least one secondary winding,
a switching transistor coupled in series with the primary winding,
an integrated circuit comprising a driver stage for controlling the switching transistor, and a control circuit with an oscillator for regulating an output voltage, the oscillator providing a frequency being adjustable via a connection,
an external capacitor coupled with a first terminal to said connection and with a second terminal to ground, said capacitor being charged and discharged by said integrated circuit for adjusting a switching frequency of the driver stage, and
a switching stage arranged between said first terminal and the secondary winding for charging the capacitor in addition by means of an oscillation occurring on the secondary winding after discharge phase of the transformer in order to determine the switch-on time of the switching transistor.

2. Switched-mode power supply according to claim 1, wherein the switching stage passes on a supply voltage to the connection when a sudden voltage change occurs on the secondary winding at the time of the oscillation.

3. Switched-mode power supply according to claim 2, wherein the secondary winding produces a positive voltage pulse, which switches on the switching stage, when the oscillation occurs.

4. Switched-mode power supply according to claim 2, wherein a voltage divider is arranged between the switching stage and the secondary winding in order to set a threshold value for the switching stage.

5. Switched-mode power supply according to claim 2, wherein a capacitor is arranged between the switching stage and the secondary winding in order to limit a voltage pulse.

6. Switched-mode power supply according to claim 1 wherein the switching stage is coupled to an output of the driver stage in order to block the switching stage when the switching transistor is switched on.

7. Switched-mode power supply according to claim 6, wherein the switching stage is coupled via a resistor and a diode to the output of the driver stage.

8. Switched-mode power supply according to claim 4, wherein the switching stage has a first switch, which is connected between the supply voltage and the connection and is switched on by a second switch when the voltage on the secondary winding exceeds the threshold value predetermined by the voltage divider.

9. Switched-mode power supply according to claim 1, wherein the secondary winding is an auxiliary winding on the primary side of the transformer.

10. Switched-mode power supply according to claim 1, the oscillator is controlled by an external circuit with a sawtooth voltage via the connection, the external circuit comprising a resistor and the capacitor, and wherein a logic circuit in the integrated circuit in each case alternately uses a first sawtooth pulse from the sawtooth voltage to limit a time for which the switching transistor is switched on and a second sawtooth pulse from the sawtooth voltage in order to determine a phase in which the switching transistor is switched off.

11. Switched-mode power supply according to claim 10, wherein the supply voltage is a reference voltage which is produced via an output of the integrated circuit.

* * * * *